United States Patent [19]
Kodama et al.

[11] Patent Number: 5,566,338
[45] Date of Patent: Oct. 15, 1996

[54] INTERRUPT CONTROL METHOD AND INTERRUPT CONTROL CIRCUIT IN A PROCESSOR

[75] Inventors: Hisashi Kodama; Toshiyuki Araki, both of Osaka, Japan

[73] Assignee: Matsushita Electric Industrial Co. Ltd., Osaka, Japan

[21] Appl. No.: 251,410

[22] Filed: May 31, 1994

[30] Foreign Application Priority Data

Jun. 1, 1993 [JP] Japan .................................. 5-130341
May 24, 1994 [JP] Japan .................................. 6-109932

[51] Int. Cl.⁶ .................................................. G06F 13/00
[52] U.S. Cl. ............................ 395/733; 364/DIG. 1; 364/230; 364/230.2; 364/240; 364/242.0; 395/868; 395/375
[58] Field of Search ............................ 395/733, 737, 395/738, 868, 375

[56] References Cited

U.S. PATENT DOCUMENTS 3,984,820 10/1976 Stanley et al. ........................ 395/725
4,484,271 11/1984 Miu et al. ............................. 395/375
4,488,227 12/1984 Miu et al. ............................. 395/725
4,755,938 7/1988 Takahashi et al. .................... 395/725
4,800,491 1/1989 Hardy .................................. 395/425
4,809,164 2/1989 Fuller .................................. 395/725
4,885,682 12/1989 Komoto ............................... 395/375
4,912,628 5/1990 Briggs .................................. 395/725
5,280,618 1/1994 Takagi ................................. 395/725
5,355,459 10/1994 Matsuo et al. ....................... 395/800
5,418,968 5/1995 Gobeli ................................. 395/725

Primary Examiner—Ayaz R. Sheikh
Attorney, Agent, or Firm—McDermott, Will & Emery

[57] ABSTRACT

According to the present invention, during the execution of a series of processes in an ordinary program, if a process being executed is suspended by the interrupt of another process, it is judged, upon completion of the execution of the interrupt process, whether a return to the above suspended process in the ordinary program is to be made or a branch return to another process is to be made, depending on the result of the interrupt process. Consequently, if the resumption of the suspended process in the ordinary program becomes no more necessary depending on the result of the interrupt process, another required process can be initiated immediately without resuming the unnecessary process.

14 Claims, 18 Drawing Sheets

INTERRUPT CONTROL METHOD AND INTERRUPT CONTROL CIRCUIT IN A PROCESSOR

BACKGROUND OF THE INVENTION

The present invention relates to an improved method and circuit for controlling an interrupt whereby an ordinary flow of a program being executed in a processor is forcibly suspended and another more urgent and significant program is executed instead.

Below, a description will be given to a conventional method of controlling an interrupt in a processor. If an interrupt is requested during the execution of a program, the processor is brought into an interrupt state so as to suspend the process being executed in the program. Prior to the execution of another process interrupting, the processor stores the address (specifically, the value of a program counter for specifying the address of an instruction to be subsequently executed so as to control the sequential execution of instructions) of the process suspended in the above program and writes the address of the interrupt process in the above program counter. The processor then executes the interrupt process and, upon completion of the execution of the process, reads out the value stored in the above program counter, so as to return to the above suspended process and resume it.

In addition to the interrupt control method mentioned above, there is another interrupt control method whereby, if another interrupt is requested by an interrupt process that is more urgent during the execution of the above interrupt process, the operation proceeds to execute the program that is more urgent than the previous interrupt program. When the execution of the more urgent process is completed, the operation returns to the previous interrupt process and resumes it. When the execution of the previous interrupt process is completed, the operation returns to the original process and resumes it.

A conventional interrupt control circuit comprises: a stack of LIFO (last-in first-out) structure for temporarily storing data required for returning to the original process that has been suspended when the execution of the interrupt process is completed; and a stack pointer for saving the data in the stack and fetching the data stored in the stack, so as to implement the above interrupt control.

However, since the operation returns, upon completion of the execution of the interrupt process, to the original, suspended process and resumes it, as shown in FIGS. 17 and 18, the above conventional interrupt control method is disadvantageous in that the resumption of the original, suspended process may become meaningless or unnecessary, depending on the result of the interrupt process.

A specific description will be given to the disadvantage mentioned above. In the case where a sequence of image data is compressed (the amount of image data is reduced by encryption) and stored, e.g., it is assumed that the sequence of image data is expanded (image data is restored by decoding) and the expanded image data is displayed on the screen of a display unit. In general, each set of compressed image data is preliminarily subjected to error detection (for an error not in a compression process but in data transmission or the like) and, if any error that is correctable is detected, a correction process is performed so as to correct the error, followed by an expansion process. Subsequently, a display process is performed in which the sets of image data obtained through the expansion process are sequentially displayed in real time in the corresponding pixels on the screen of the display unit. In the case where the sets of image data which correspond in number to one screen on the display unit (for one frame) are displayed in one screen, if an error in data transmission or the like is detected in the above sets of image data for one frame and if it is judged that the sets of image data for one frame cannot be displayed in one screen because the error is uncorrectable, it is meaningless to perform the subsequent expansion process with respect to the above sets of image data for one frame. In this case, according to the conventional interrupt control methods, interrupt control is implemented by displaying again the previous sets of image data for one frame upon detection of the error in the sets of image data. After the processing, however, the unnecessary process of expanding sets of image data subsequent to the above set of image data containing the error is resumed, which renders the conventional interrupt control methods disadvantageous.

SUMMARY OF THE INVENTION

It is therefore an object of the present invention to provide an interrupt control method and an interrupt control circuit whereby the operation can jump (branch) to another process that is required depending on the result of an interrupt process, without returning to the suspended process according to the result of the process.

To attain the above object, a method of controlling an interrupt in a processor according to the present invention comprises the steps of: suspending, on receiving an interrupt instruction, a process being executed and storing the address of the suspended process; then forcibly executing an interrupt process; and then fetching, upon completion of the execution of said interrupt process, the address stored in said stack and selecting said fetched address or the address of a process other than said suspended process depending on the result of the interrupt process, so as to shift to a process according to the selected address.

A circuit for controlling an interrupt in a processor according to the present invention comprises: an interrupt processing means for receiving an interrupt instruction, suspending a process being executed, and forcibly executing an interrupt process; an interrupt address storing means for storing the address of the process suspended by said interrupt processing means; an address selecting means for selecting, upon completion of the execution of the interrupt process by said interrupt processing means, the address stored in said interrupt address storing means or the address of a process other than said suspended process depending on the result of the interrupt process; and a process shifting means for shifting to a process according to the address selected by said address selecting means.

As for which process should be selected as the shift destination depending on the result of the interrupt process having been executed, if the result of the interrupt process is predictable, the address of a process which will serve as the shift destination may be stored preliminarily in the processor or it may also be inputted from the outside to the processor.

With the above constitution, according to the present invention, it is judged whether or not a return should be made to the suspended process depending on the result of the interrupt process having been executed. If it is required to make a return, the address of the suspended process is selected so as to resume the original, suspended process. If a branch return is to be made to another process, on the other hand, the address of the process which will serve as the shift destination is selected so that the required process is initiated immediately, without resuming the original, suspended process meaninglessly.

As a constitution for branching to another process without returning to the suspended process, e.g., there can be listed a constitution wherein the stack is cleared by resetting the value of the stack pointer so as to exit from the interrupt state, the address of the branch destination is then saved in the stack, the saved address of the above branch destination is fetched from the stack (POP), the address of the branch destination is written in the program counter, and the process is performed following an instruction according to the address of the branch destination. However, since the interrupt process is generally performed in a mode which cannot be programmed freely by the user, it is difficult for the user to reset the stack pointer without fetching the saved data from the stack. As a result, control over the stack becomes extremely complicated as well as a shift to another process by abandoning the suspended process cannot be achieved easily. Consequently, in the case of branching to another process upon completion of the interrupt process, if a constitution is adopted in which the saved data is fetched from the stack but abandoned (not used) and the address of the branch destination is written in the program counter, it becomes possible to abandon the suspended process and shift to another process, while easily controlling the stack.

The above object and novel features of the present invention will more fully appear from the following detailed description when the same is read in connection with the accompanying drawings.

BRIEF DESCRIPTION OF THE DRAWINGS

The accompanying drawings show preferred embodiments of the present invention, wherein.

DETAILED DESCRIPTION OF THE PREFERRED EMBODIMENTS

Referring now to the accompanying drawings, preferred embodiments of the present invention will be described below.

FIRST EMBODIMENT

Below, a description will be given to a first embodiment with reference to the drawings. In the first embodiment, the present invention is applied to an image processor for reproducing a dynamic image.

Figure 1:
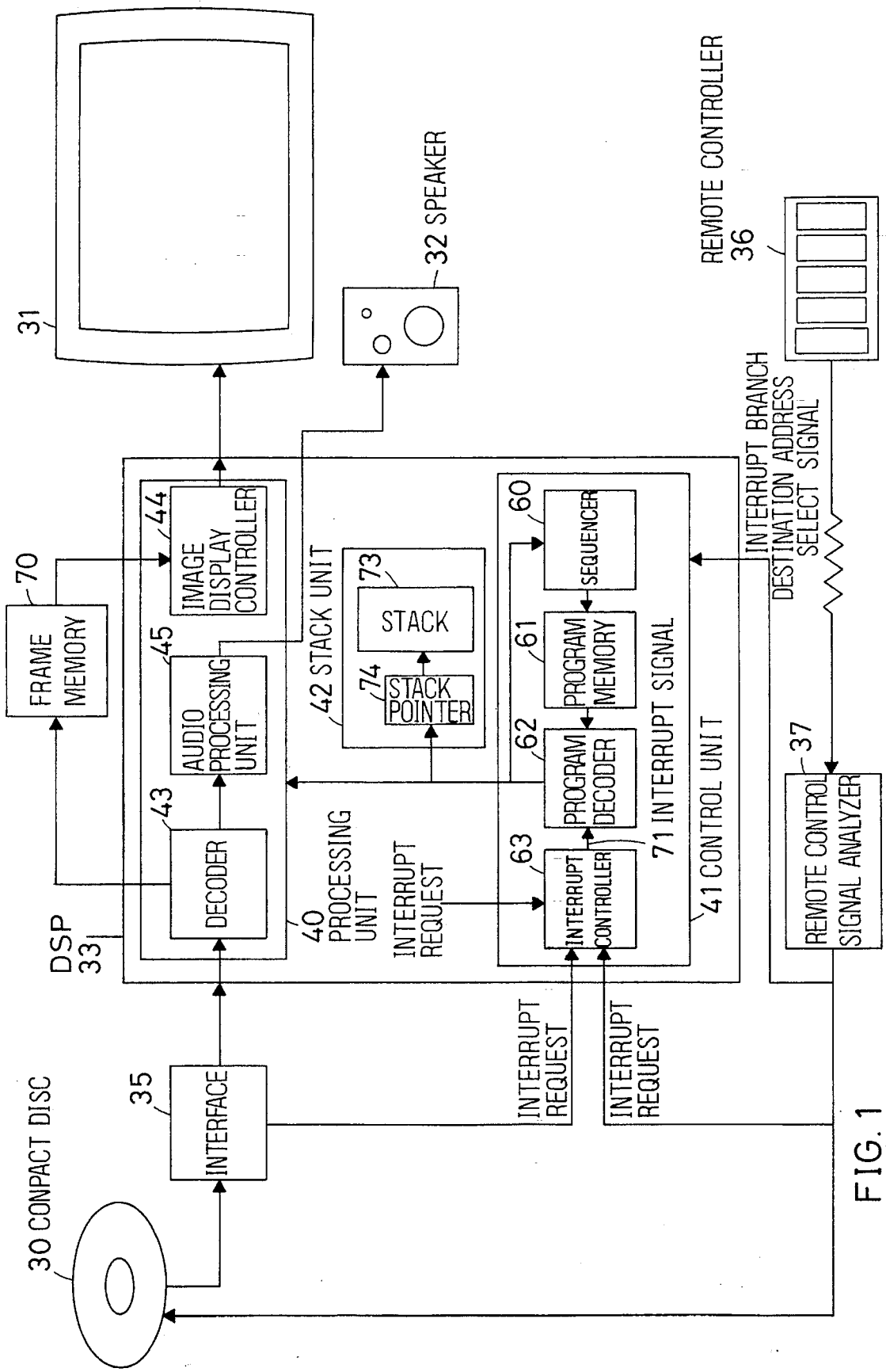
FIG. 1 is a schematic view showing the overall structure of an image processor.

FIG. 1 schematically shows the overall structure of the image processor, in which a reference numeral 30 designates a compact disc in which a compressed image signal and audio signal are stored, 31 designates a display unit, 32 designates a speaker, and 33 designates a DSP (Digital Signal Processor). The DSP 33 accepts the image signal and audio signal from the above compact disc 30 and processes them, so as to display an image on the screen of the above display unit 31 and produce an audio from the speaker 32 at the same time.

A reference numeral 35 designates an interface for accepting the image signal and audio signal from the above compact disc 30 as input signals. The interface 35 checks the parity of each of the above input signals and, if there is no error, outputs the image signal as it is to the DSP 33. On the other hand, if there is any error that is correctable, the interface 35 corrects the image signal containing the error and outputs the image signal after error correction to the above DSP 33. If there is any error that is uncorrectable, the interface 35 generates an interrupt request signal. The request signal indicates that image signals for one frame (one screen) which include one containing the uncorrectable error cannot be reproduced.

A reference numeral 36 designates a remote controller for commanding the reproduction, stop, fast forward, and fast rewinding of an image signal, 37 designates a remote control signal analyzer for outputting the interrupt request signal and an interrupt branch destination address signal for specifying the address of an interrupt process.

Inside of the above DSP 33, a reference numeral 40 designates a processing unit, 41 designates a control unit for controlling the above processing unit 40, and 42 designates a stack unit. The above processing unit 40 consists of: a decoder 43 for expanding the image signal and audio signal from the interface 35 and stores the expanded image signal in an external frame memory 70; an image display controller 44 for displaying the image data stored in the above frame memory 70 on the screen of the display unit 31; and an audio processing unit 45 for outputting the expanded audio signal from the decoder 43 to the speaker 32.

The control unit 41 of the above DSP 33 comprises: a sequencer 60 for outputting the address of an instruction to be executed and a program memory 61 in which a program code is preliminarily stored. The above program memory 61 accepts the address from the above sequencer 60 and outputs an instruction code corresponding to the address. The control unit 41 has: a program decoder 62 for analyzing the instruction code outputted from the above program memory 61 and controlling the processing unit 40 according to the instruction; and an interrupt controller 63 for accepting interrupt request signals from the interface 35 and remote control signal analyzer 37 and an interrupt request signal which is outputted when an error arises inside the DSP 33, judging whether or not each of the interrupt requests should be accepted from an interrupt mask, and outputting, in the case of acceptance, an interrupt signal 71 to the above program decoder 62.

The stack unit 42 consists of: a stack (memory) 73 of LIFO structure which serves as an address storing means; and a stack pointer 74 for specifying the address of the above stack 73. As the above stack 73, a stack used in an ordinary subroutine call instruction and the like can be used in common or another stack dedicated to an interrupt can be provided separately. However, in the case where a single stack is shared and the operation is branched to another process on returning from an interrupt, as will be described later, it is necessary to reset the stack.

Figure 2:
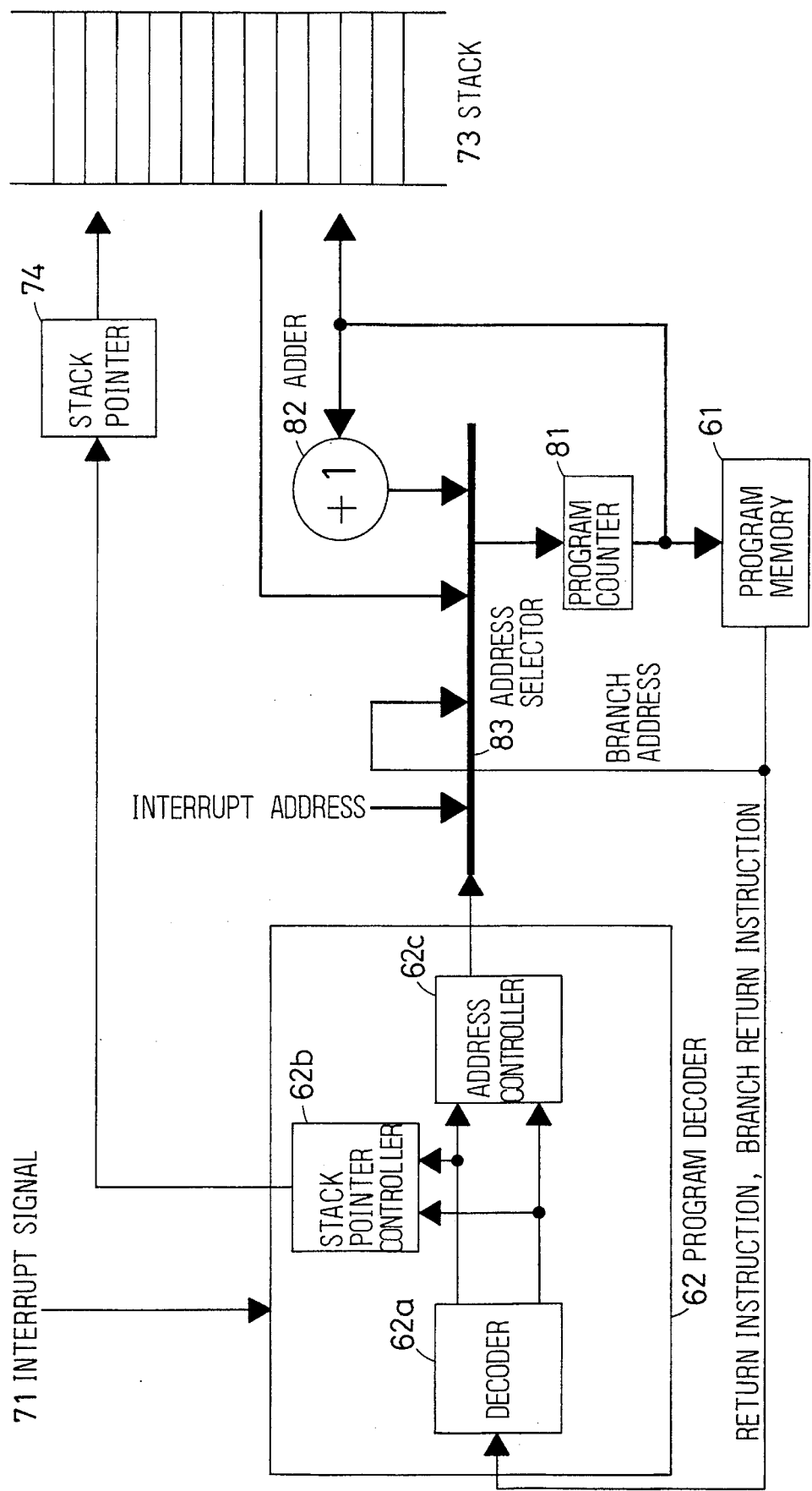
FIG. 2 is a block diagram showing in detail main portions of a control unit and stack unit according to a first embodiment of the present invention.

FIG. 2 shows a specific circuit of main portions of the above control unit 41 and stack unit 42. In the drawing, a reference numeral 61 designates the above program memory, 62 designates the above program decoder, 73 designates the above stack, and 74 designates the above stack pointer. A reference numeral 81 designates a program counter, 82 designates an adder (calculator) for adding 1 to an output of the above program counter 81, 83 designates an address selector for selecting an address to be inputted to the above program counter 81, to which an output of the above adder 82, data fetched from the above stack 73, a branch address outputted from the program memory 61, and an interrupt address are inputted. The above interrupt address is for specifying an interrupt process when the interrupt signal 71 is inputted during the execution of a sequence of processes in the program.

Upon completion of the execution of the interrupt process, if it is necessary depending on the result of the execution to return to the suspended process of an ordinary routine (designated by the symbol A in FIG. 7) and resume it, the above program memory 61 outputs an instruction to return from an interrupt. Conversely, if it is meaningless to resume the suspended process designated by the symbol A, the program memory 61 outputs a branch return instruction, which includes the address of a process to which a branch return should be made. Thus, the program memory 61 constitutes a selection commanding means for commanding which one of the above two processes the operation should return to.

The above program decoder 62 comprises: a decoder 62a for decoding the return instruction or branch return instruction from the above program memory 61; a stack pointer controller 62b; and an address controller 62c for controlling the above address selector 83.

Figure 3:
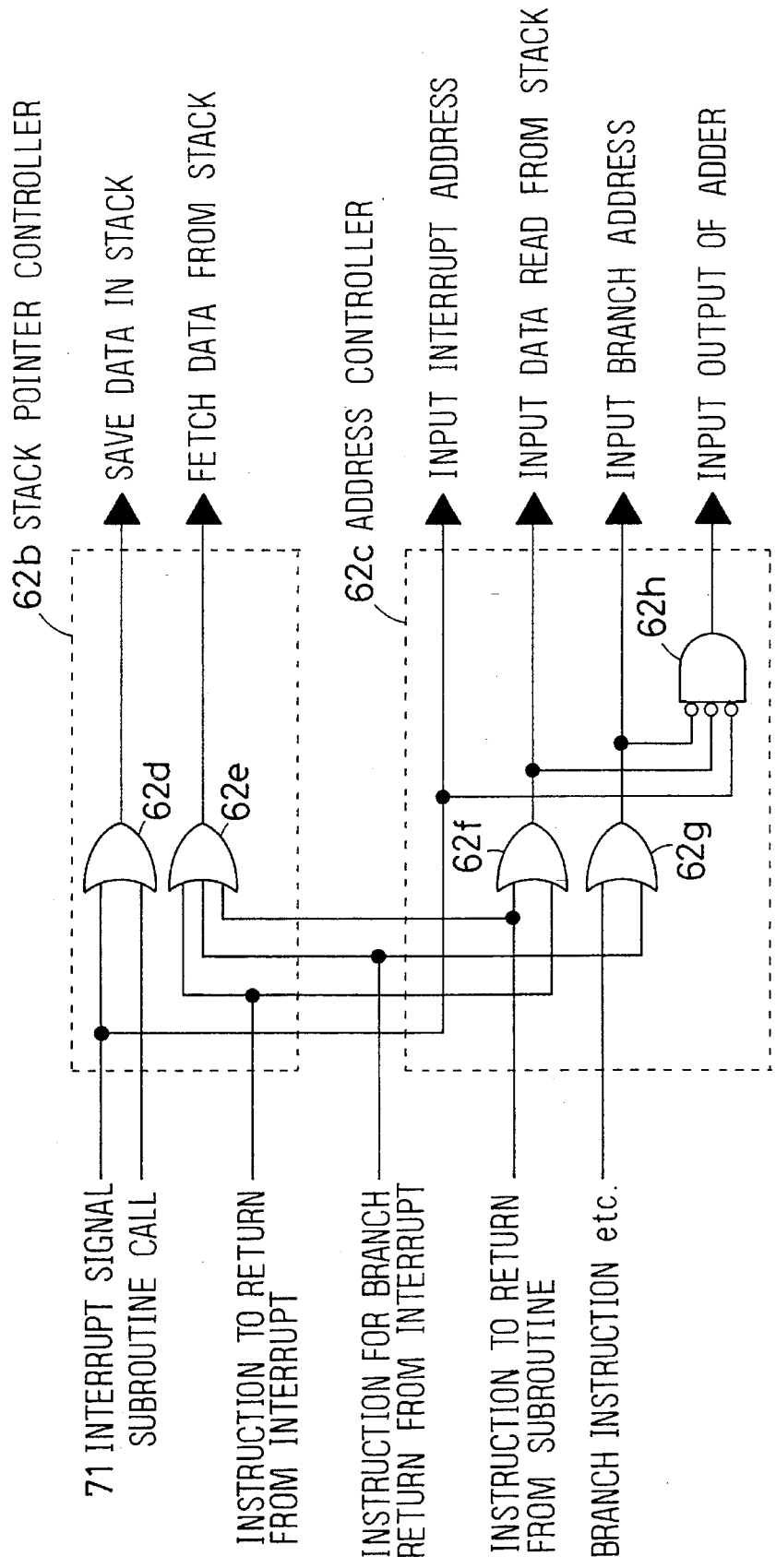
FIG. 3 is a circuit diagram showing the internal structure of a main portion of a program decoder according to the first embodiment.
Figure 4:
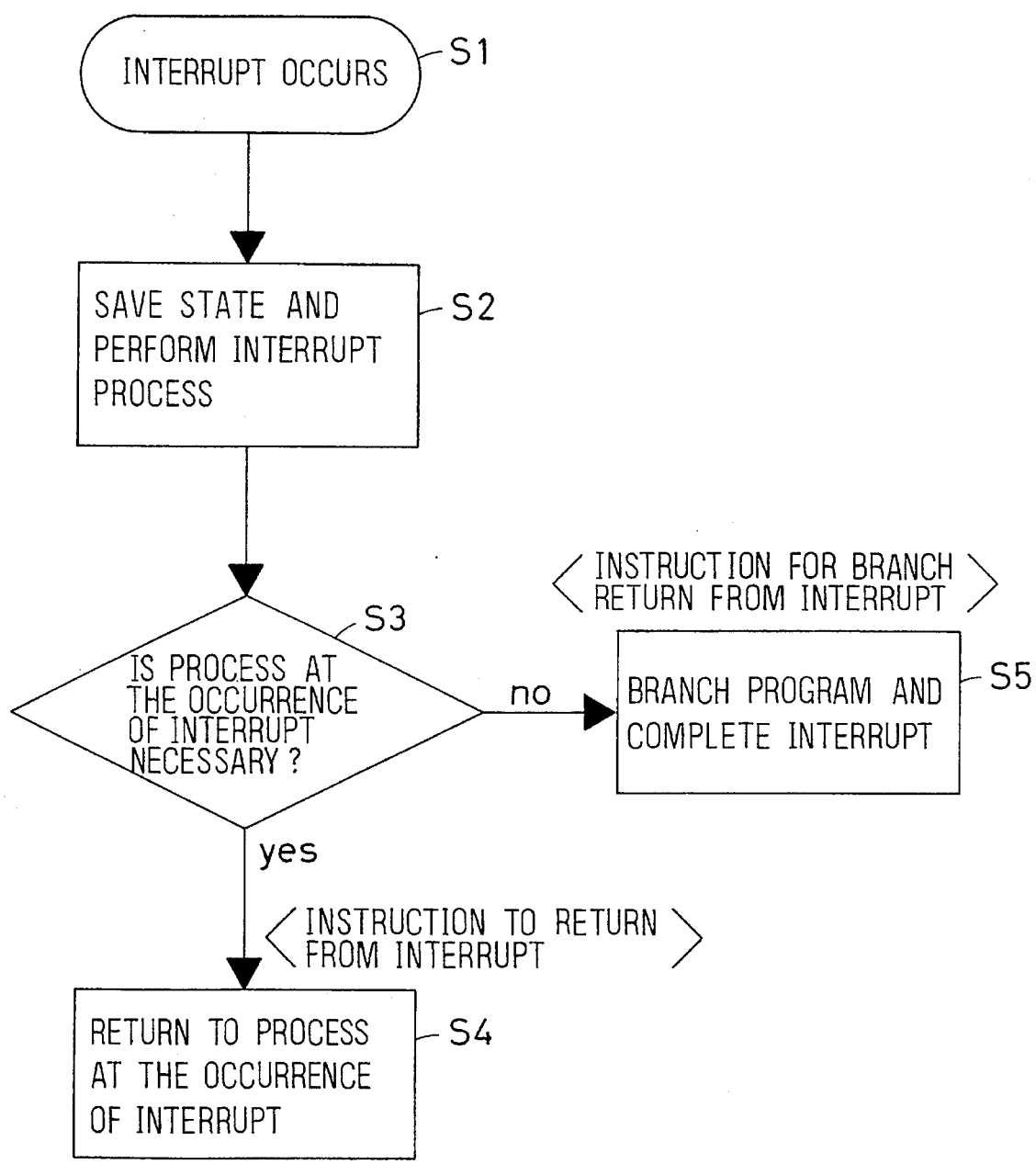
FIG. 4 is a flow chart showing a flow of processing when an interrupt is generated according to the first embodiment.

FIG. 3 shows the structure of a main portion of the above program decoder 62. In the drawing, the stack pointer controller 62b comprises two OR circuits 62d and 62e. The OR circuit 62d accepts the interrupt signal 71 or a subroutine call instruction and outputs a save command signal for saving data in the stack 73. The OR circuit 62e accepts an instruction to return from an interrupt, an instruction for branch return from an interrupt, or an instruction to return from a subroutine and outputs a fetch command signal for fetching data from the stack 73.

The address controller 62c uses the interrupt signal 71 as a signal for commanding the selection of the interrupt address and comprises: two OR circuits 62f and 62g; and one AND circuit 62h. The OR circuit 62f accepts the instruction to return from an interrupt or instruction to return from a subroutine and outputs a signal for commanding the selection of the data fetched from the stack 73. The OR circuit 62g accepts the branch instruction or instruction for branch return from an interrupt and outputs a signal for commanding the selection of the branch address. The above AND circuit 62h outputs a signal for commanding the selection of an output of the adder 82 when it accepts none of the interrupt signal 71 and outputs of the above two OR circuits 62f and 62g.

Next, the operation of the above embodiment will be described specifically with reference to FIGS. 4 to 7.

Figure 5:
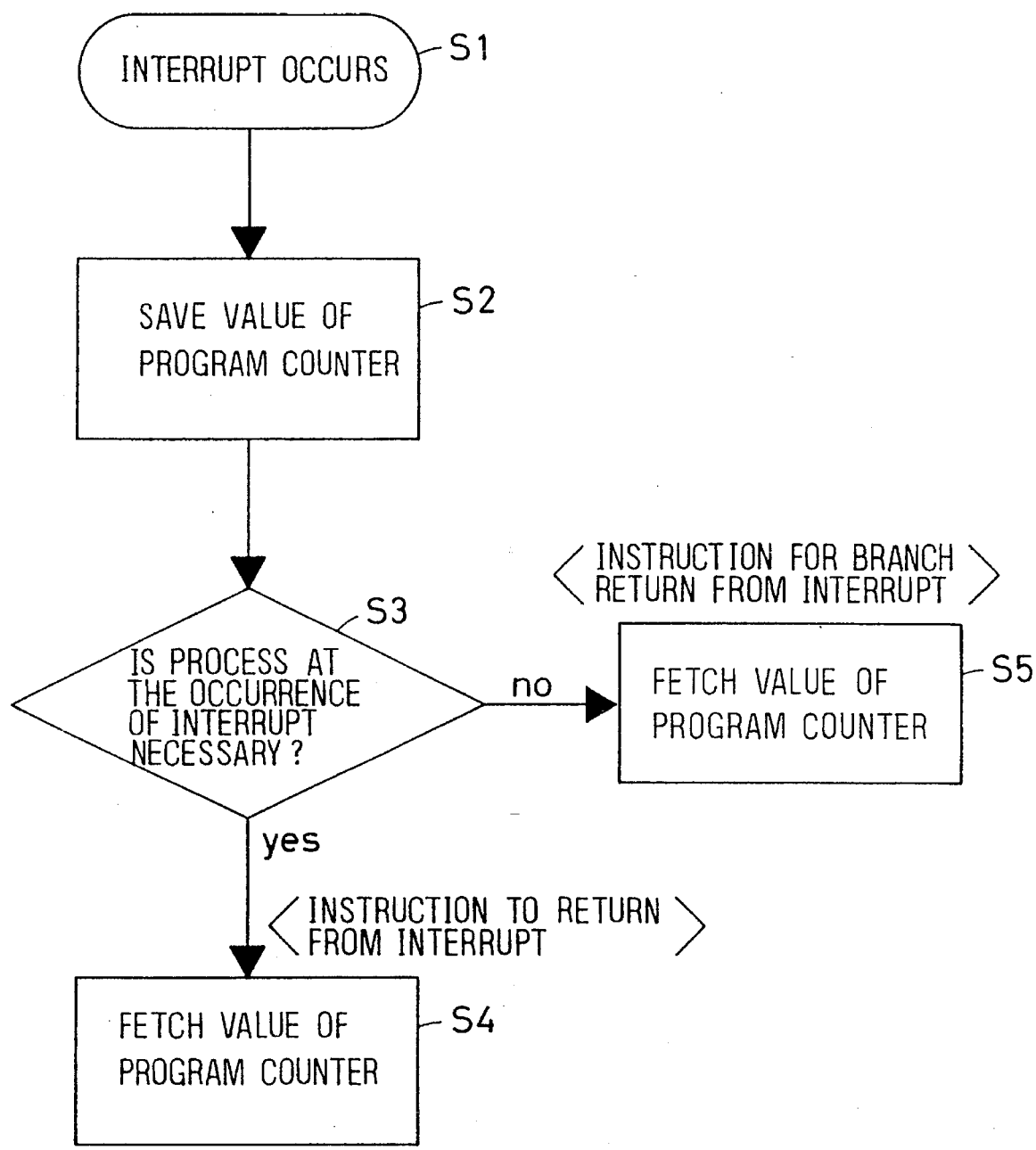
FIG. 5 is a flow chart showing control by a stack pointer controller according to the first embodiment.
Figure 6:
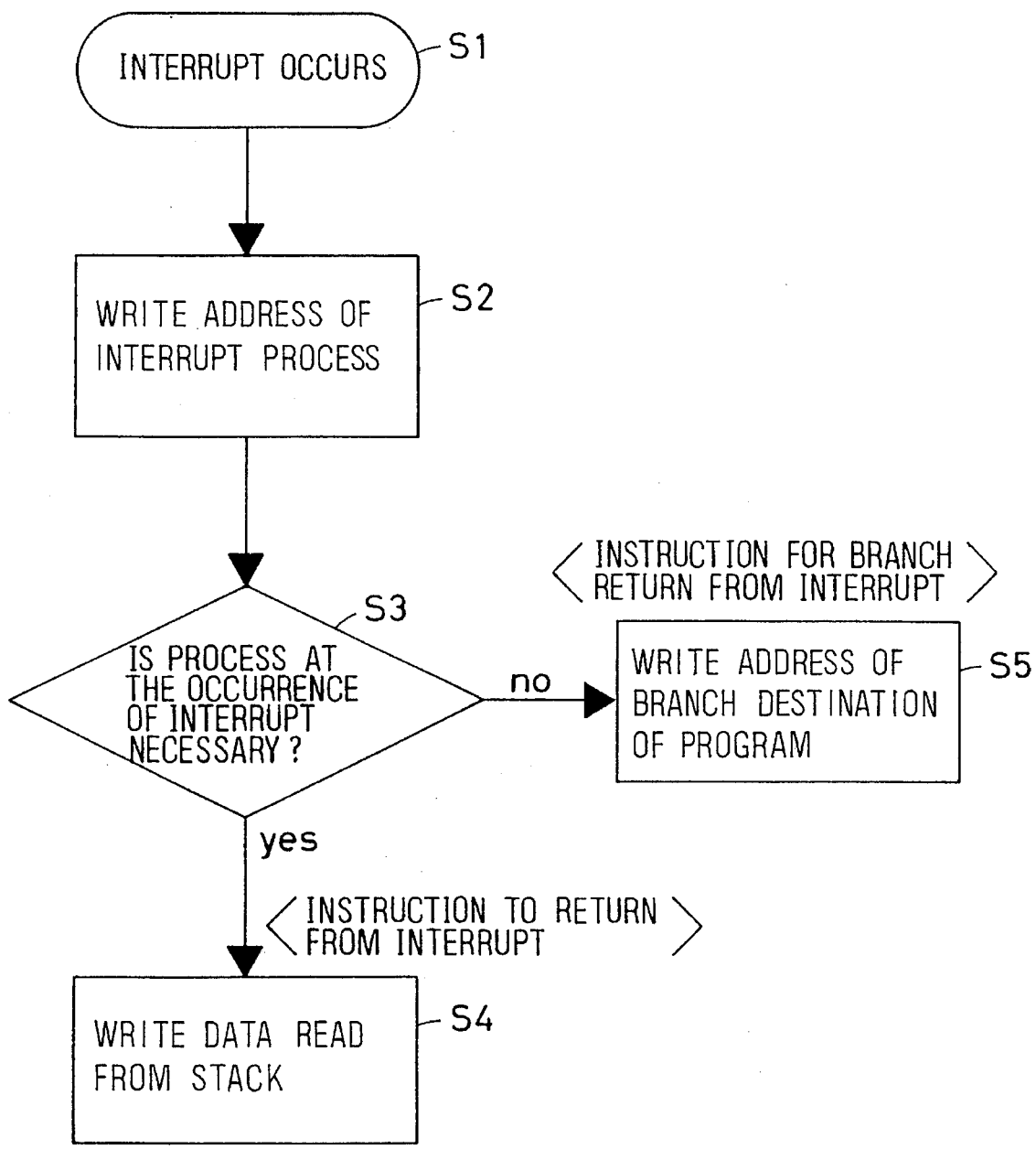
FIG. 6 is a flow chart showing control by an address controller.
Figure 7:
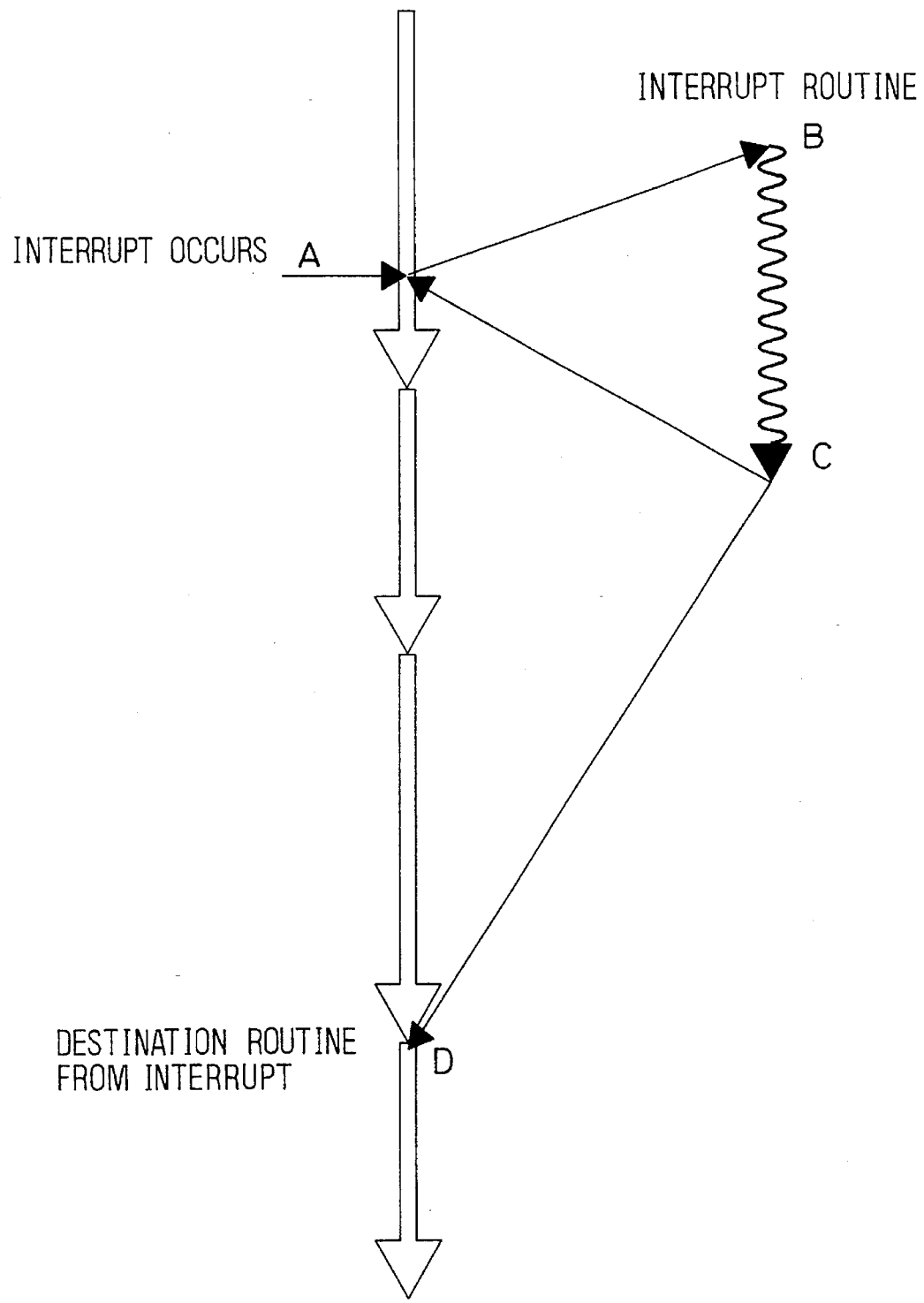
FIG. 7 is a view illustrating the operation of the first embodiment.
Figure 8:
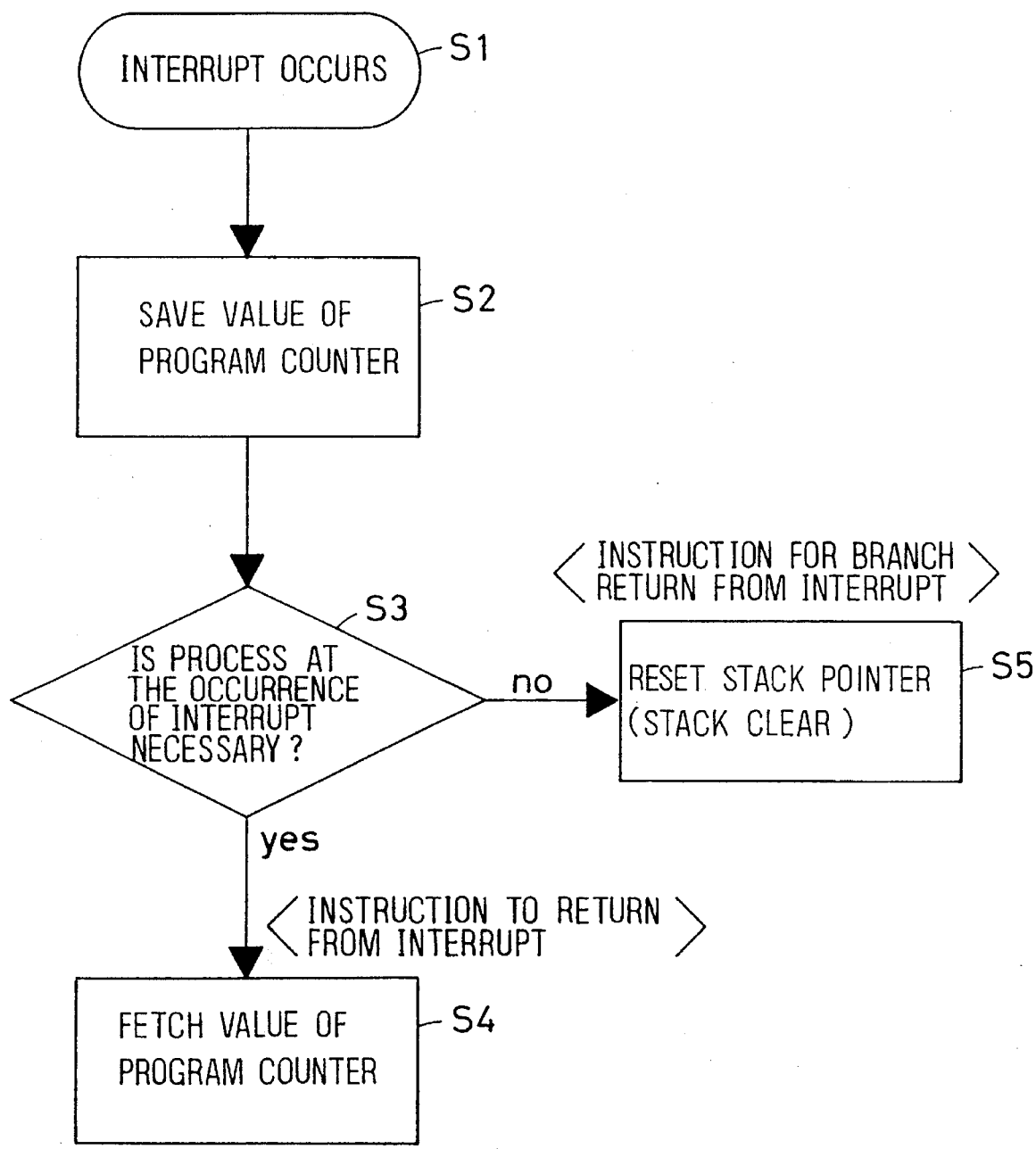
FIG. 8 is a flow chart showing control by the stack pointer controller when an interrupt program being executed is interrupted by another interrupt program.

In FIG. 7, while a sequence of processes of the ordinary routine are executed, if the interrupt controller 63 generates the interrupt signal 71 during the execution of a process designated by the symbol A, the stack pointer controller 62b controls the stack pointer 74 so that data required for making a return, such as the value of the program counter 81, is stored in the stack 73 (Step S2 of FIG. 5). The address controller 62c controls the address selector 83 so that the interrupt address is inputted to the program counter 81. Consequently, the program memory 61 outputs an instruction code according to the interrupt address outputted from the above program counter 81, so that the process according to the interrupt address (e.g., a process designated by the symbol B of FIG. 7) interrupts to be initiated.

After that, upon completion of the process of the above interrupt routine (designated by the symbol C of FIG. 7), if it is necessary to return, depending on the result of the process of the interrupt routine, to the suspended process of the ordinary routine (the process designated by the symbol A of FIG. 7) and resume it, the program memory 61 outputs an instruction to return from an interrupt. If the decoder 62a of the program decoder 62 decodes the instruction accordingly, the stack pointer controller 62b controls the stack pointer 74 so that the saved data is fetched from the stack 73 (Step S4 of FIG. 5). Subsequently, the address controller 62c controls the address selector 83 so that the address fetched from the above stack 73 is inputted to the program counter 81. As a result, the program memory 61 outputs an instruction code according to the data (saved address) outputted from the above program counter 81, so that, upon completion of the interrupt process of FIG. 7, the operation exits from the interrupt state by returning to the suspended process of the ordinary routine designated by the symbol A of FIG. 7, thereby resuming the subsequent process.

Conversely, if the resumption of the suspended process (the process designated by the symbol A of FIG. 7) of the ordinary routine is meaningless, depending on the result of the execution of the process of the interrupt routine, the program memory 61 outputs an instruction for branch return from an interrupt. The decoder 62a of the program decoder 62 decodes the instruction accordingly and the stack pointer controller 62b controls the stack pointer 74 so that the saved data is fetched from the stack 73 (Step S4 of FIG. 5), as described above. This time, however, the address controller 62c controls the address selector 83 so that the branch address (e.g., the address of a process designated by the symbol D of FIG. 7) included in the above instruction for branch return from an interrupt is inputted to the program counter 81. As a result, the program memory 61 outputs an instruction code according to the branch address outputted from the above program counter 81, so that the process exits from the interrupt state by returning to the process according to the branch address of the ordinary routine, thereby performing the process designated by the symbol D of FIG. 7.

Since the stack 73 and stack pointer 74 are under the same control both in outputting the instruction to return from an interrupt and in outputting the instruction for branch return from an interrupt, it is possible, in returning from the interrupt routine to the ordinary routine, to make a branch return to a process other than the suspended process of the ordinary routine without complicating the control over the stack 73 and stack pointer 74.

Although a return to the ordinary routine was made upon completion of the execution of the interrupt routine in the present embodiment, if another interrupt routine is to be executed during the execution of the previous interrupt routine, the above structure may be modified as follows. That is, since the additional instruction for return from an interrupt is provided according to the present invention, if the instruction for branch return from an interrupt is outputted, the stack pointer controller 62b controls the stack pointer 74 so that it is reset to the initial state in making a branch return, instead of fetching the preliminarily saved data from the stack 73 so as to be prepared for return to the suspended process, thereby releasing the entire region of the stack 73.

SECOND EMBODIMENT

Below, a second embodiment of the present invention will be described.

Figure 9:
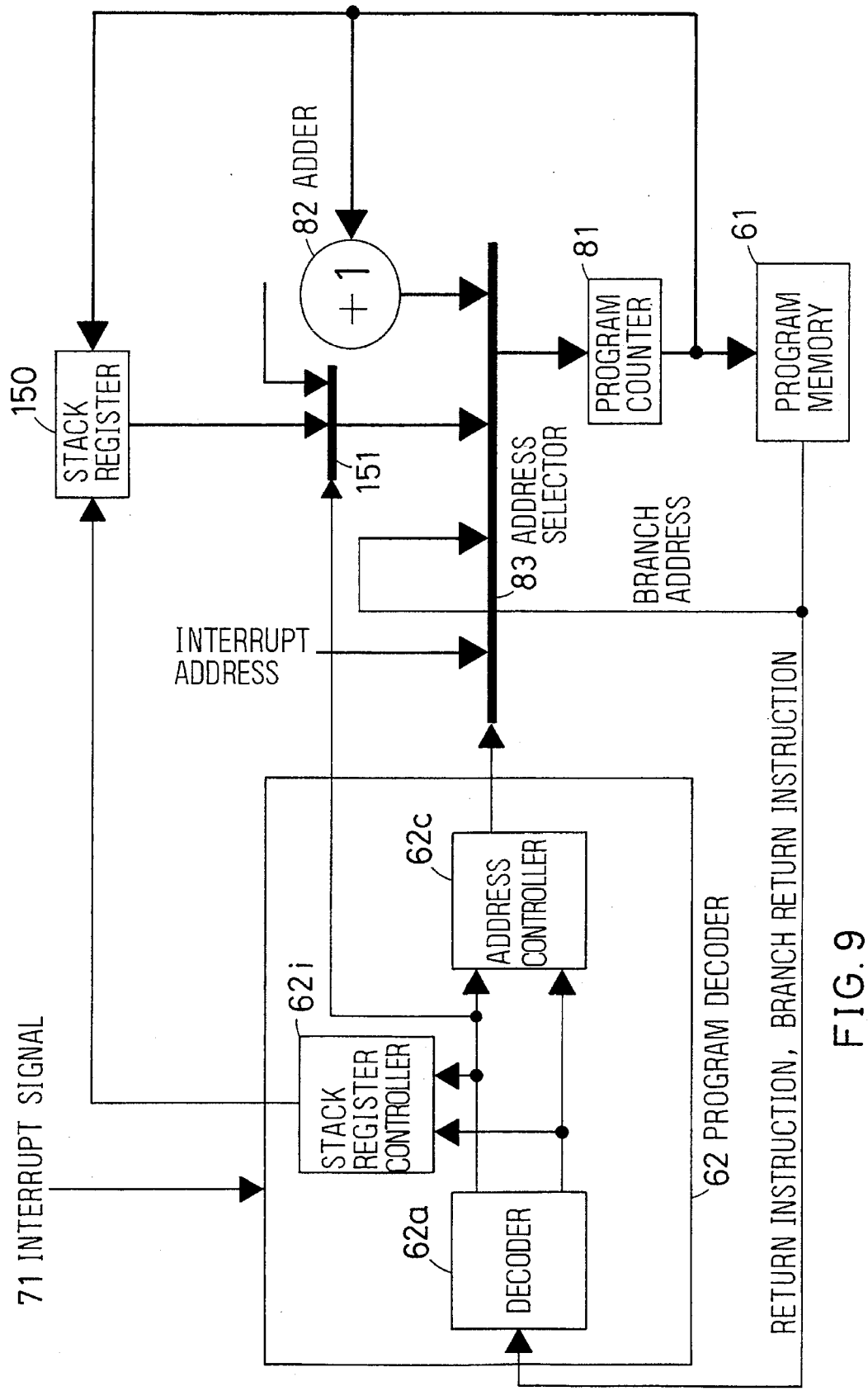
FIG. 9 is a block diagram showing in detail main portions of the control unit and stack unit according to a second embodiment of the present invention.
Figure 10:
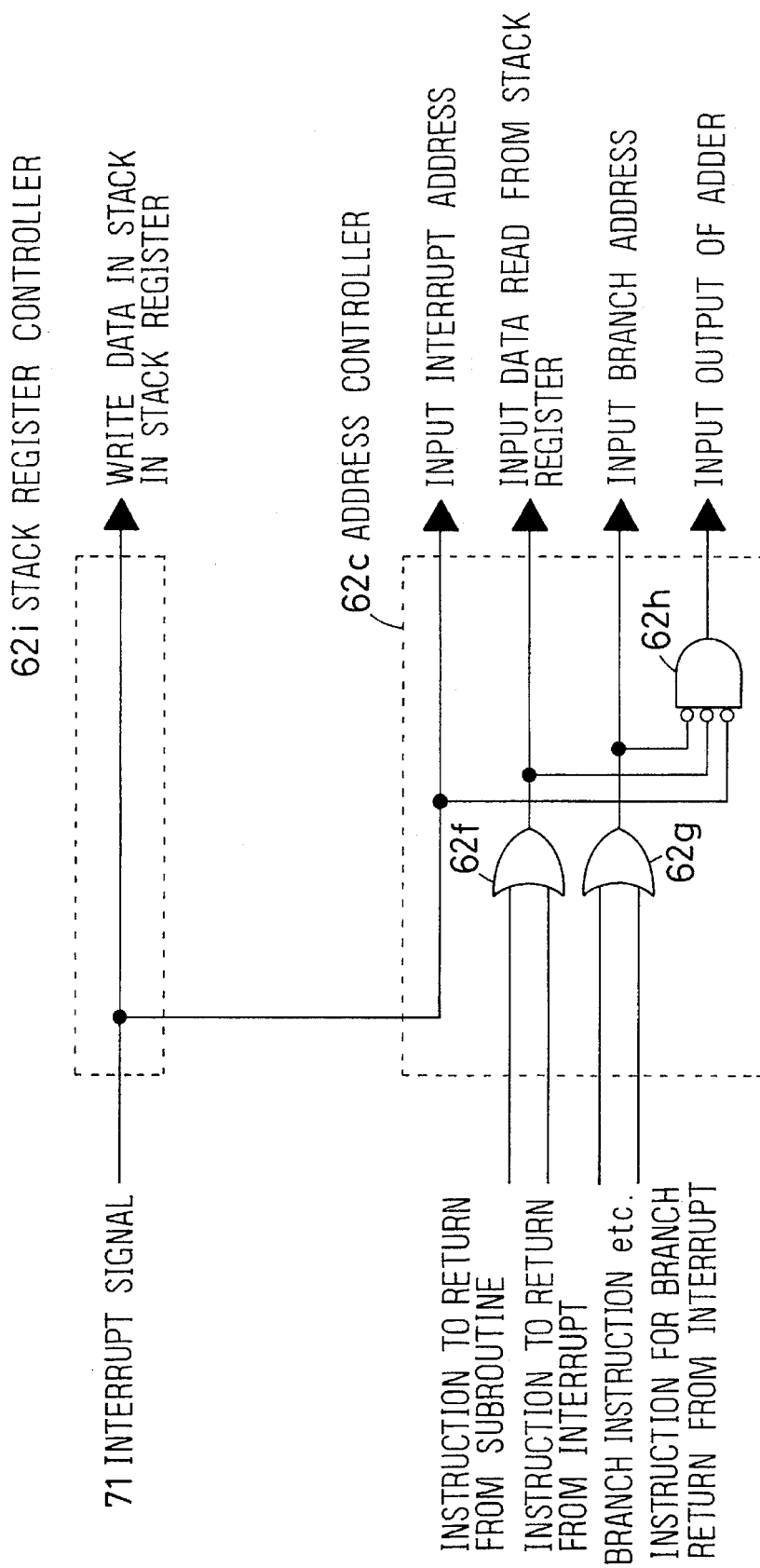
FIG. 10 is a circuit diagram showing the internal structure of a main portion of the program decoder according to the second embodiment.

The present embodiment shows the case wherein only a single interrupt is enabled by inhibiting the interrupt of another process during the execution of the interrupt process. FIG. 9 shows the structure of the present embodiment, in which a stack register 150 is provided in place of the stack 73 and stack pointer 74 of FIG. 2. The stack register 150 has a capacity sufficient to store only a single instruction address. The program decoder 62 is provided with a stack register controller 62i, instead of the stack pointer controller 62b of FIG. 2. The above stack register controller 62i generates a write instruction signal to write data in response to an interrupt signal and outputs it to the stack register 150, as shown in FIG. 10, thereby writing the value of the program counter 81 (an instruction address at the time of interrupt) in the stack register 150. The structure of the address controller 62c of FIG. 10 is the same as that of FIG. 2.

In FIG. 9, the address selector 83 receives an output of a selector 151 which selects either data fetched from the stack register 150 or data fetched from a stack (not shown) for a process of the ordinary routine.

Thus, in the case of enabling only a single interrupt in the present embodiment, it is possible to make a return from the interrupt state using the simple structure, so that a branch return is made to a process other than the suspended process.

THIRD EMBODIMENT

Below, a third embodiment of the present invention will be described.

According to the present embodiment, in the case of making a branch return from the interrupt state to a process other than the suspended process, the address of the process to which a branch return is to be made can be inputted from the outside.

Figure 11:
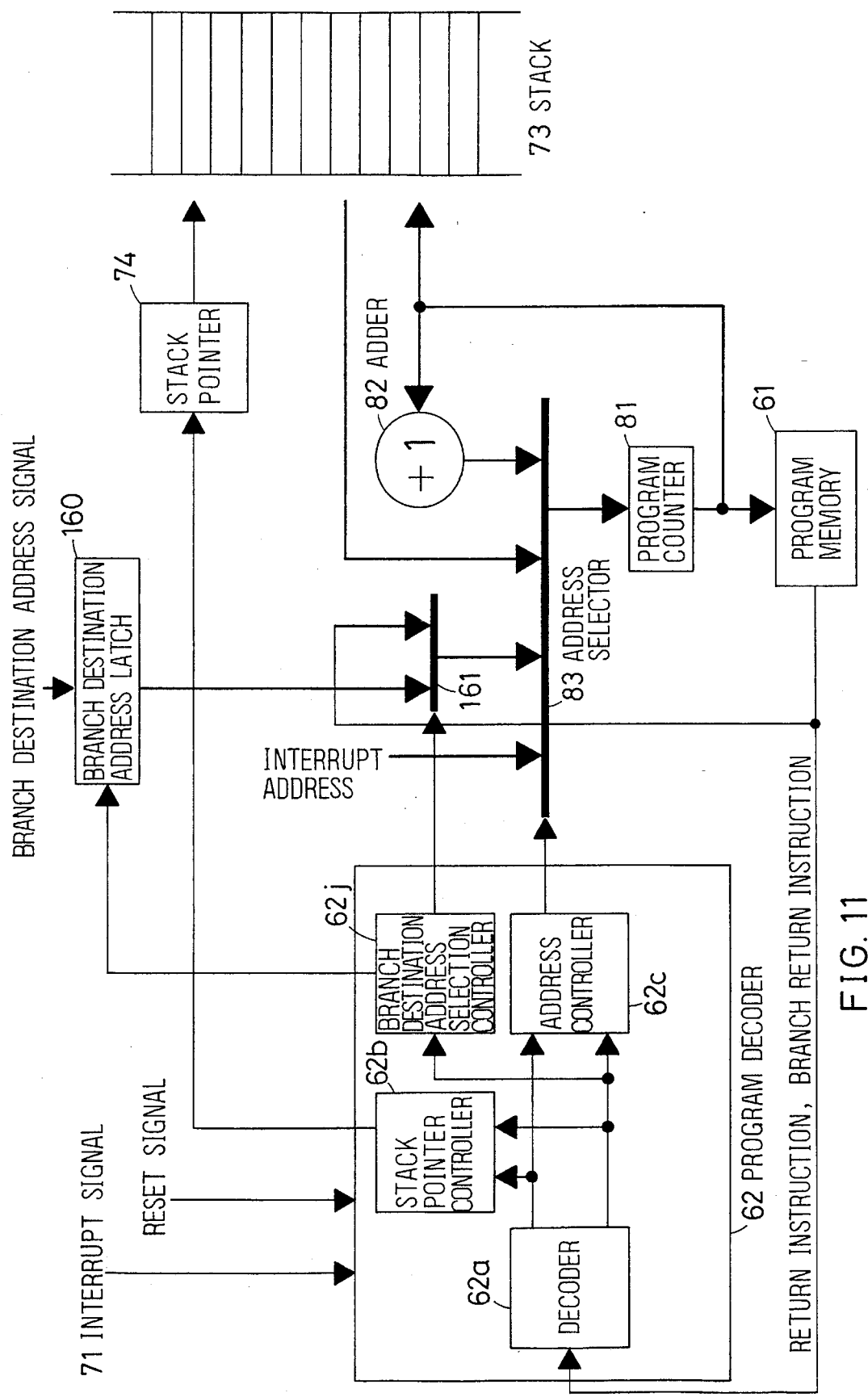
FIG. 11 is a block diagram showing in detail main portions of the control unit and stack unit according to a third embodiment of the present invention.

FIG. 11 shows the structure of the present embodiment. In the drawing, a description will be given only to these components which are not used in the first embodiment shown in FIG. 2: a reference numeral 160 designates a branch destination address latch for accepting a branch destination address signal which is inputted from the outside of the processor (DSP) to the inside of the DSP; and 161 designates a branch destination address selector for selecting either a branch destination address outputted from the above branch destination address latch 160 or a branch destination address specified by a branch instruction based on the ordinary subroutine call from the program memory 61 and outputting the selected branch destination address to the address selector 83.

Figure 12:
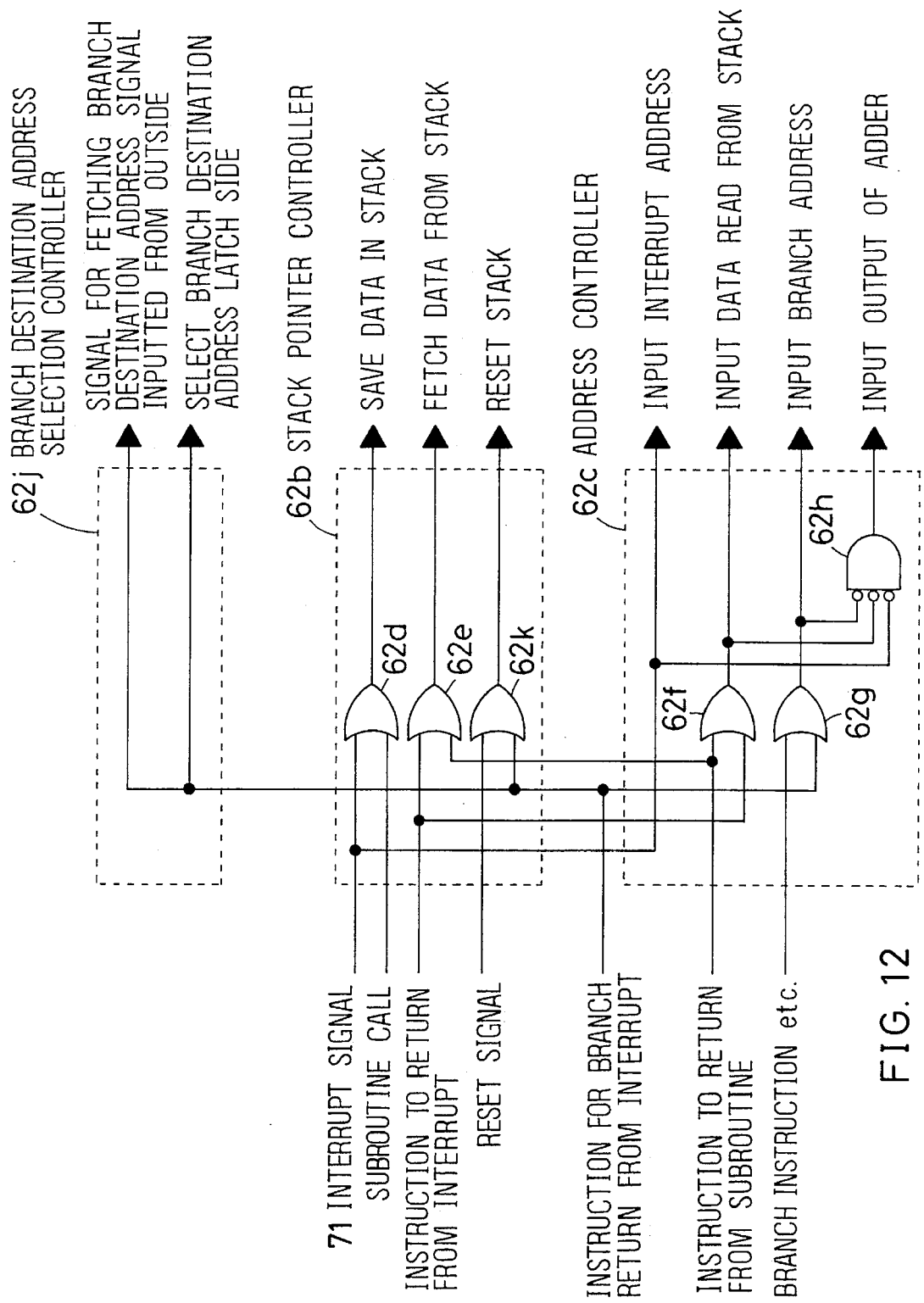
FIG. 12 is a circuit diagram showing the internal structure of the program decoder according to the third embodiment.

In addition to the components shown in FIG. 2, the program decoder 62 is internally provided with a branch destination address selection controller 62j for controlling the above branch destination address latch 160 and branch destination address selector 161. FIG. 12 shows the internal structure of the branch destination address selection controller 62j, which receives an instruction for branch return from an interrupt that has been outputted from the program memory 61 and outputs a signal for fetching a branch destination address signal to the branch destination address latch 160 so that the branch destination address latch 160 fetches the branch destination address signal, while controlling the branch address selector 161 so that the branch destination address of the above branch destination address latch 160 is outputted. Hence, in making a branch return from the interrupt, the branch destination address signal inputted from the outside is inputted to the program counter 81, so that a branch return is made to the branch destination address inputted from the outside.

As shown in FIG. 11, a reset signal is also inputted from the outside of the DSP. The reset signal is inputted to an OR circuit 62k which is separately provided in the stack pointer controller 62b, as shown in FIG. 12. The above OR circuit 62k receives the above reset signal and a decoded instruction for branch return from an interrupt and resets the stack pointer 74 to the initial state, so as to reset the stack 73.

Thus, according to the present embodiment, it is possible, in the case of making a branch return from the interrupt, to make a branch return to the branch destination address inputted from the outside.

FOURTH EMBODIMENT

Below, a fourth embodiment of the present invention will be described.

In contrast to the above third embodiment in which the branch address is inputted from the outside, a plurality of branch addresses are preliminarily stored inside the DSP in the present embodiment so that a branch address to which a branch return is to be made can be selected therefrom by a select signal inputted from the outside. The present embodiment also provides a characteristic structure to the stack for saving data.

Figure 13:
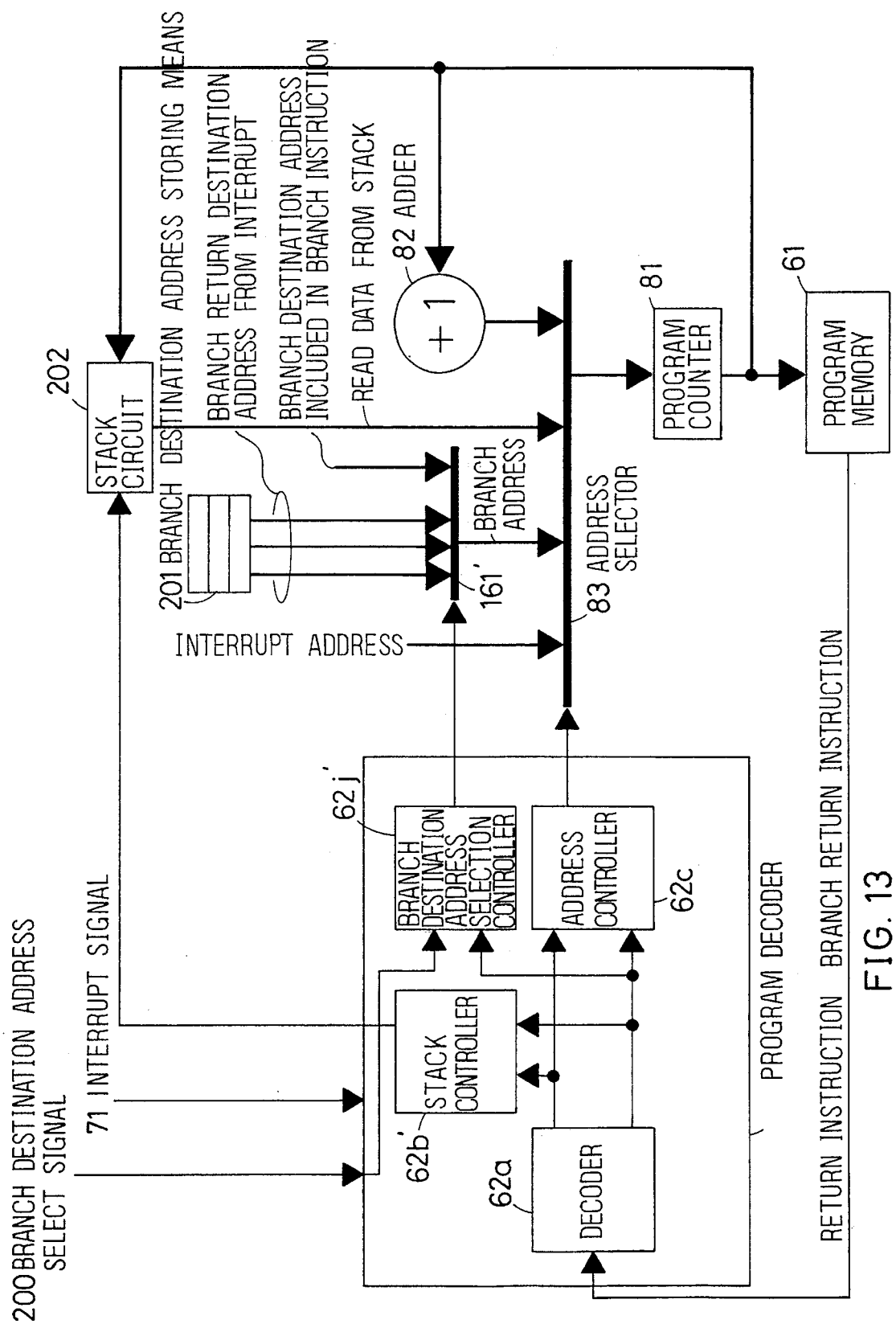
FIG. 13 is a block diagram showing in detail main portions of the control unit and stack unit according to a fourth embodiment of the present invention.

FIG. 13 shows the fourth embodiment of the present embodiment. In the drawing, a description will be given only to these components which are not used in the third embodiment shown in FIG. 3: a reference numeral 200 designates a branch destination address select signal (address select signal) to be inputted from the outside of the DSP to its inside; 201 designates a branch destination address storing means in which a plurality of branch destination addresses are preliminarily stored; and 202 designates a stack circuit, the specific structure of which will be described later. The plurality of branch destination addresses preliminarily stored in the above branch destination address storing means 201 (three addresses are stored in the drawing) are inputted to the branch destination address selector 161'.

Figure 14:
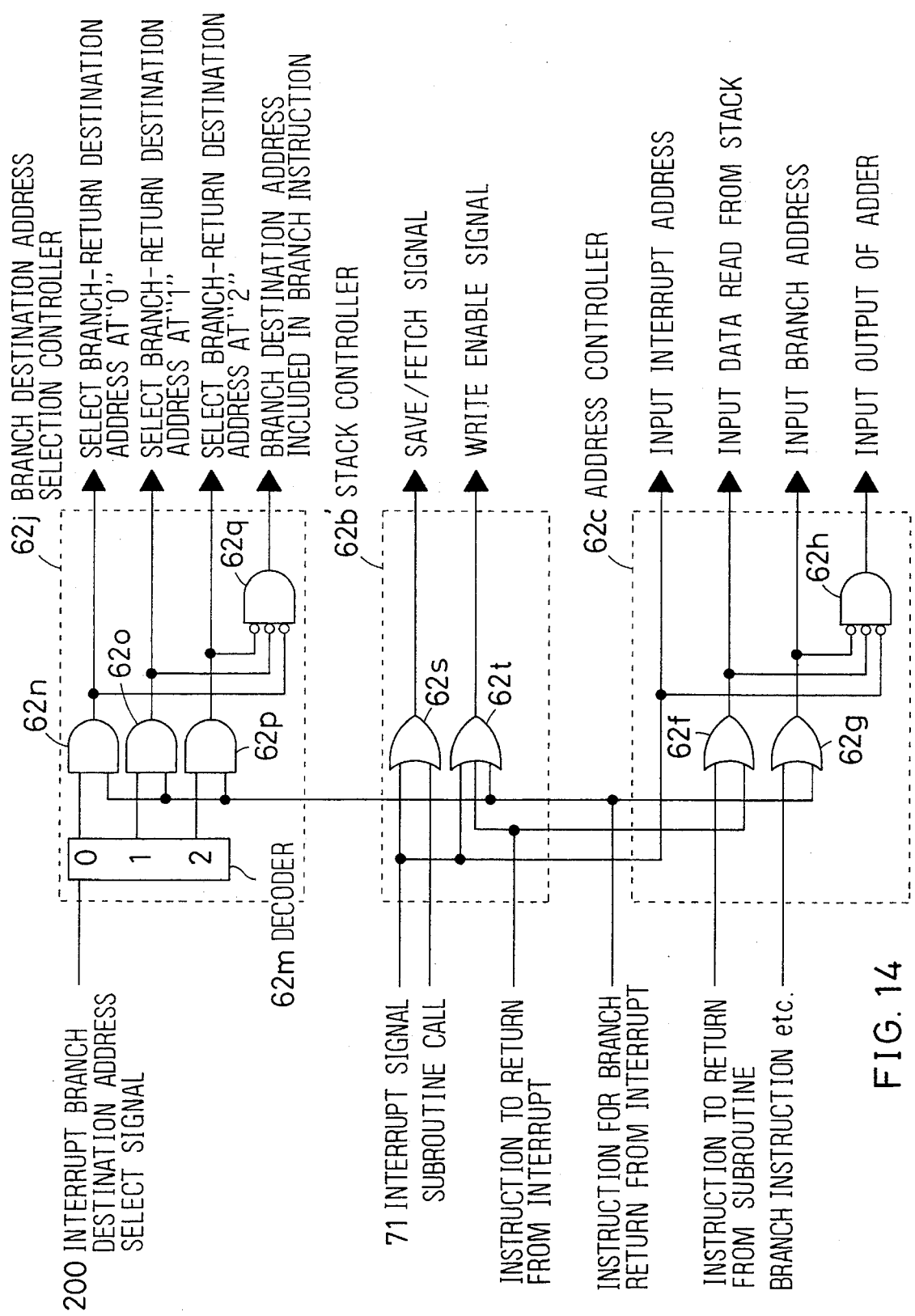
FIG. 14 is a circuit diagram showing the internal structure of a main portion of the program decoder according to the fourth embodiment.

The branch destination address selection controller 62j' of the program decoder 62 is for controlling the branch destination address selector 161'. As shown in FIG. 14, the branch destination address selection controller 62j comprises: a decoder 62m; and four AND circuits 62n to 62q. The above decoder 62m decodes the above branch destination address select signal 200 inputted from the outside and judges whether the type of the select signal is "0", "1" or "2". On sequentially receiving an instruction for branch return from an interrupt and a "0" decode signal from the above decoder 62m, the AND circuit 62n controls the branch destination address selector 161' so that it selects the branch destination address preliminarily stored at the "0" address of the above branch destination address storing means 201. On sequentially receiving an instruction for branch return from an interrupt and a "1" decode signal from the above decoder 62m, the AND circuit 62o controls the branch destination address selector 161' so that it selects the branch destination address preliminarily stored at the "1" address of the above branch destination address storing means 201. Similarly, on sequentially receiving an instruction for branch return from an interrupt and a "2" decode signal from the above decoder 62m, the AND circuit 62p controls the branch destination address selector 161' so that it selects the branch destination address preliminarily stored at the "2" address of the above branch destination address storing means 201. The AND circuit 62q controls, if no branch destination address is selected by the above three AND circuits 62n to 62p, the branch destination address selector 161 so that it selects the branch destination address specified by the branch instruction based on the ordinary subroutine call from the program memory 61.

Figure 15:
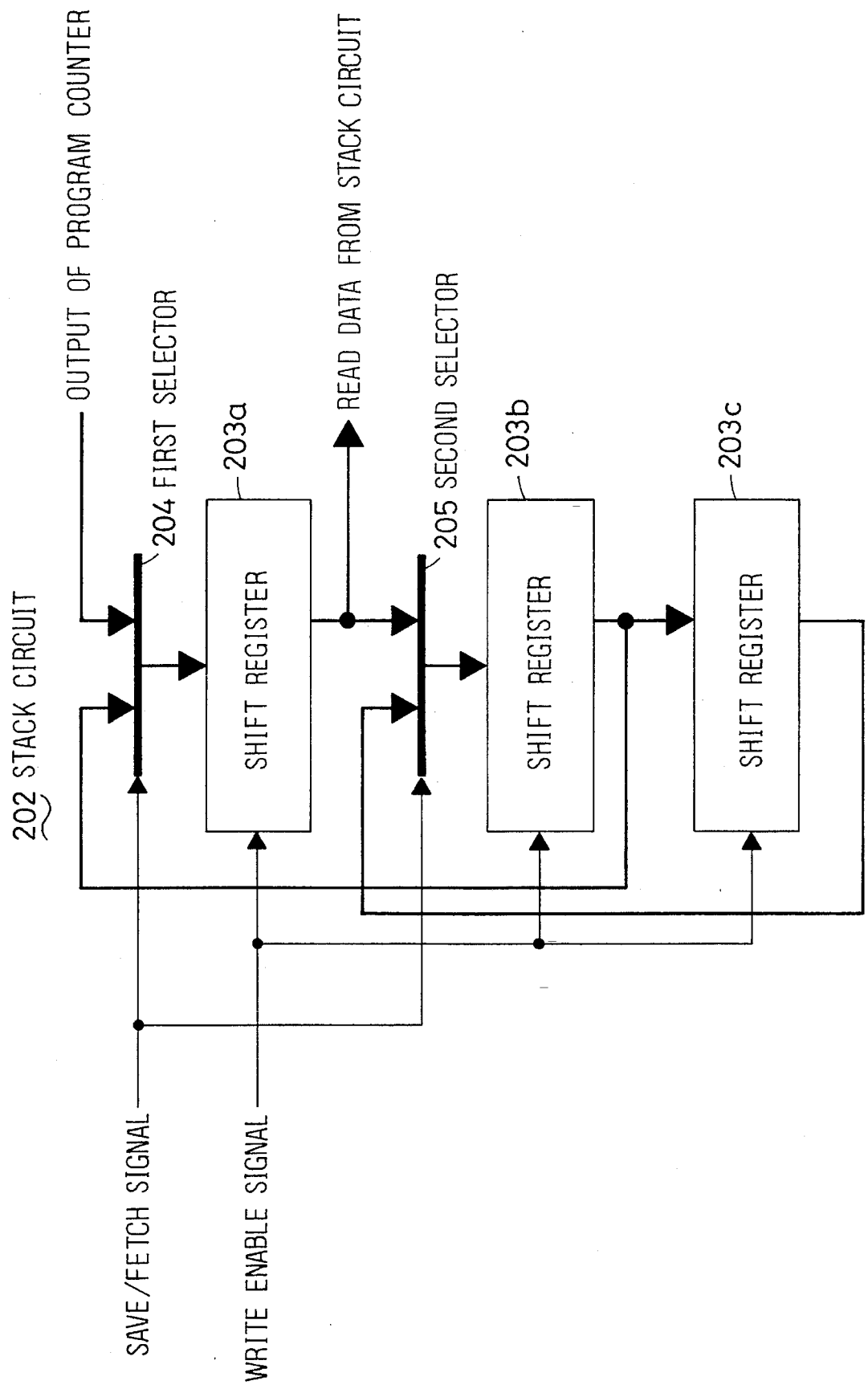
FIG. 15 is a view specifically showing the structure of a stack circuit according to the fourth embodiment.

FIG. 15 shows a specific structure of the above stack circuit 202. The stack circuit 202 of FIG. 15 has: three shift registers 203a, 203b, and 203c; a first selector 204 for selecting an input of the shift register 203a in the first stage; and a second selector 205 for selecting an input of the shift register 203b in the second stage. To the above first selector 204 are inputted an output of the program counter 81 (i.e., the address of a process to be saved) and an output of the shift register 203c in the third stage. To the second selector 205 are inputted an output of the upper-stage shift register 203a and an output and input of the lower-stage shift register 203c. Each of the above selectors 204 and 205 is controlled by a save/fetch signal outputted from the stack controller 62a in the program decoder 62. The above three shift registers 203a to 203c are controlled by a write enable signal outputted from the above stack controller 62b. An output of the shift register 203a in the first stage becomes data to be fetched from the stack circuit 202.

The stack controller 62b' in the above program decoder 62 is for controlling the above stack circuit 202. The stack controller 62b' is internally provided with two OR circuits 62s and 62t. The OR circuit 62s receives the interrupt signal 71 or subroutine call signal and outputs the save/fetch signal to each of the above first and second selectors 204 and 205. The OR circuit 62t receives the interrupt signal 71, signal for return from an interrupt, or signal for branch return from an interrupt and outputs a write enable signal to each of the shift registers 203a to 203c. When an output of the program counter 81 is saved in the stack circuit 202, the first selector 204 inputs an output of the program counter 81 to the shift register 203a in the first stage, while the second selector 205 inputs an output of the shift register 203a in the first stage to the shift register 203b in the second stage. Consequently, the data stored in the shift register 203b in the second stage is outputted to the shift register 203c in the third stage. On the other hand, when the stored data is fetched from the stack circuit 202, the first selector 204 inputs an output of the shift register 203b in the second stage to the shift register 203a in the first stage, while the second selector 205 inputs an output of the shift register 203c in the third stage to the shift register 203b in the second stage. Consequently, the data stored in the shift register 203a in the first stage is fetched to the outside.

Thus, according to the present embodiment, it is possible to select any of the plurality of branch addresses preliminarily stored inside and to make a branch return to the selected branch address. In the case where the branch addresses according to the "reproduction," "fast forward", and "fast rewinding" of an image in the image processor of FIG. 1 are stored in the branch destination address storing means 201, e.g., if the operator operates the remote controller 36 to request the "reproduction" during the rewinding operation of the image, an interrupt request signal and a branch destination address select signal for selecting the "reproduction", each of which is outputted from the remote control signal analyzer 37, can achieve a branch shift from the rewinding state to the reproductive state as the operator requested. These processes are performed not in the supervisor state of the DSP 33, but in the user state thereof.

Moreover, since the stack circuit 202 can be controlled by two signals consisting of the save/fetch signal and write enable signal from the stack controller 62b an address calculation generally required to control a stack is no more necessary, resulting in simpler control. Furthermore, the stack circuit 202 is allowed several levels of nesting depending on the number of the shift registers 203a to 203c (three) provided therein.

Figure 16:
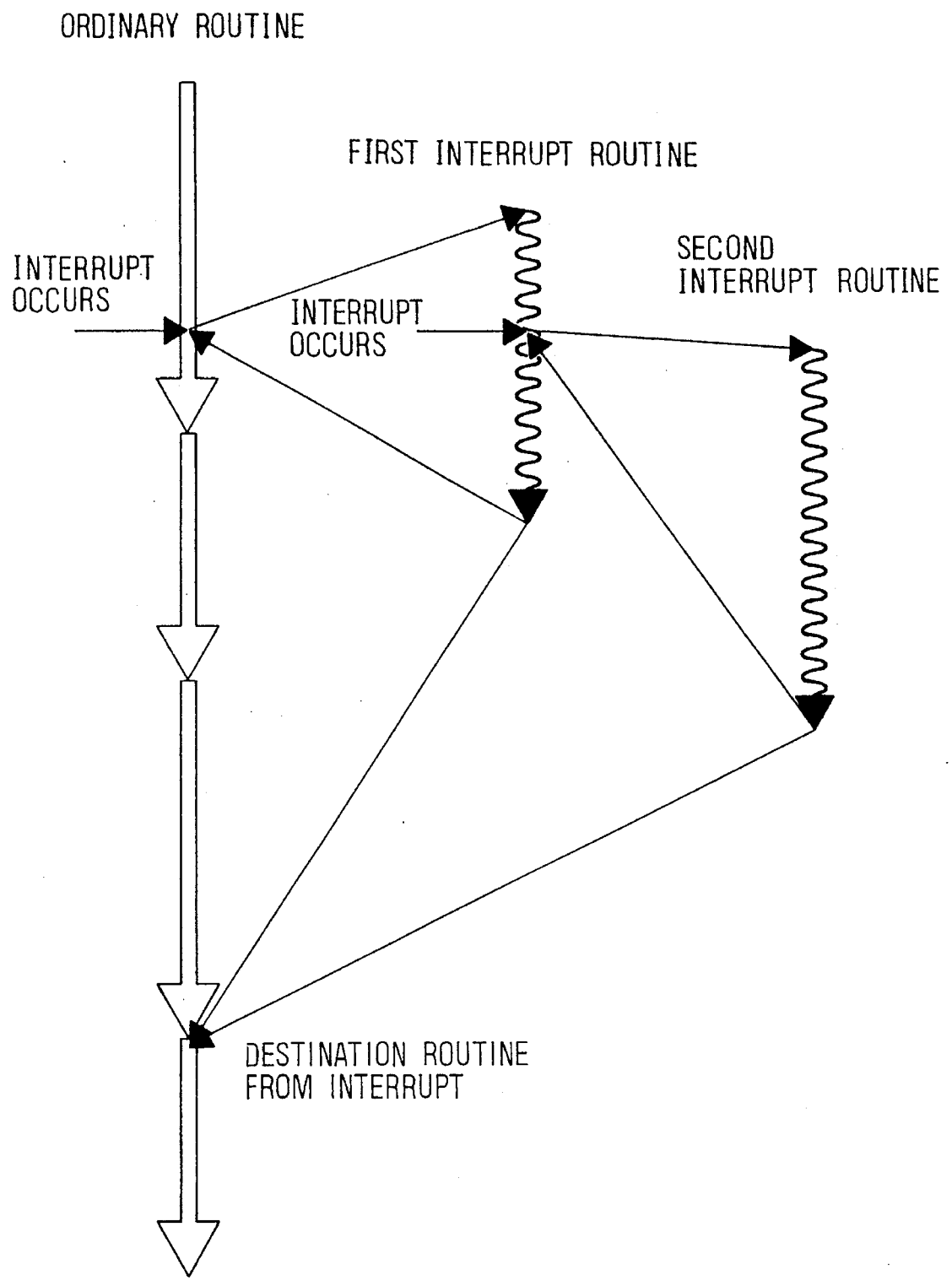
FIG. 16 is a view illustrating the case where a double interrupt is enabled in the fourth embodiment.
Figure 17:
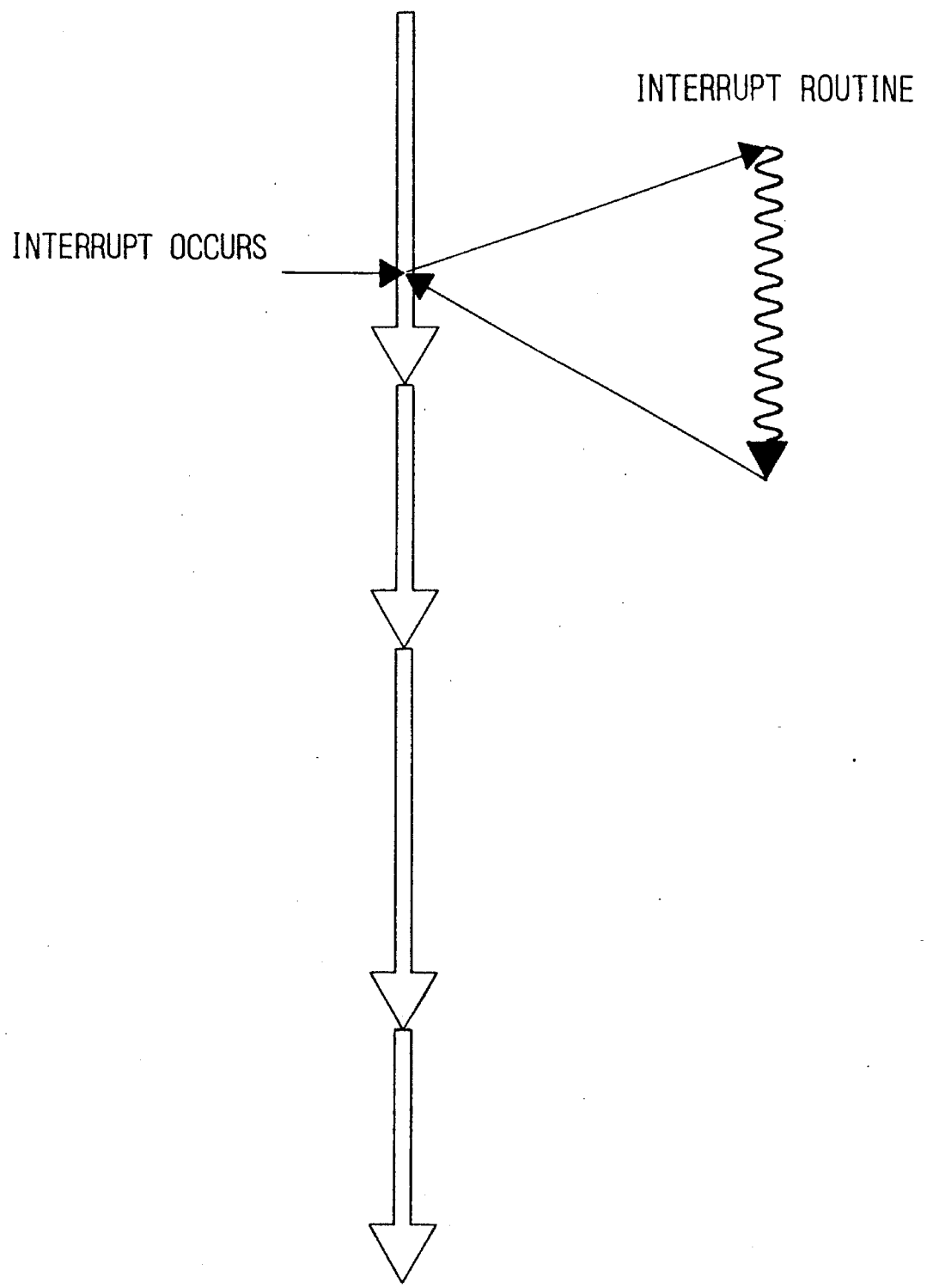
FIG. 17 is a view illustrating the case where a single interrupt is enabled in a conventional embodiment.
Figure 18:
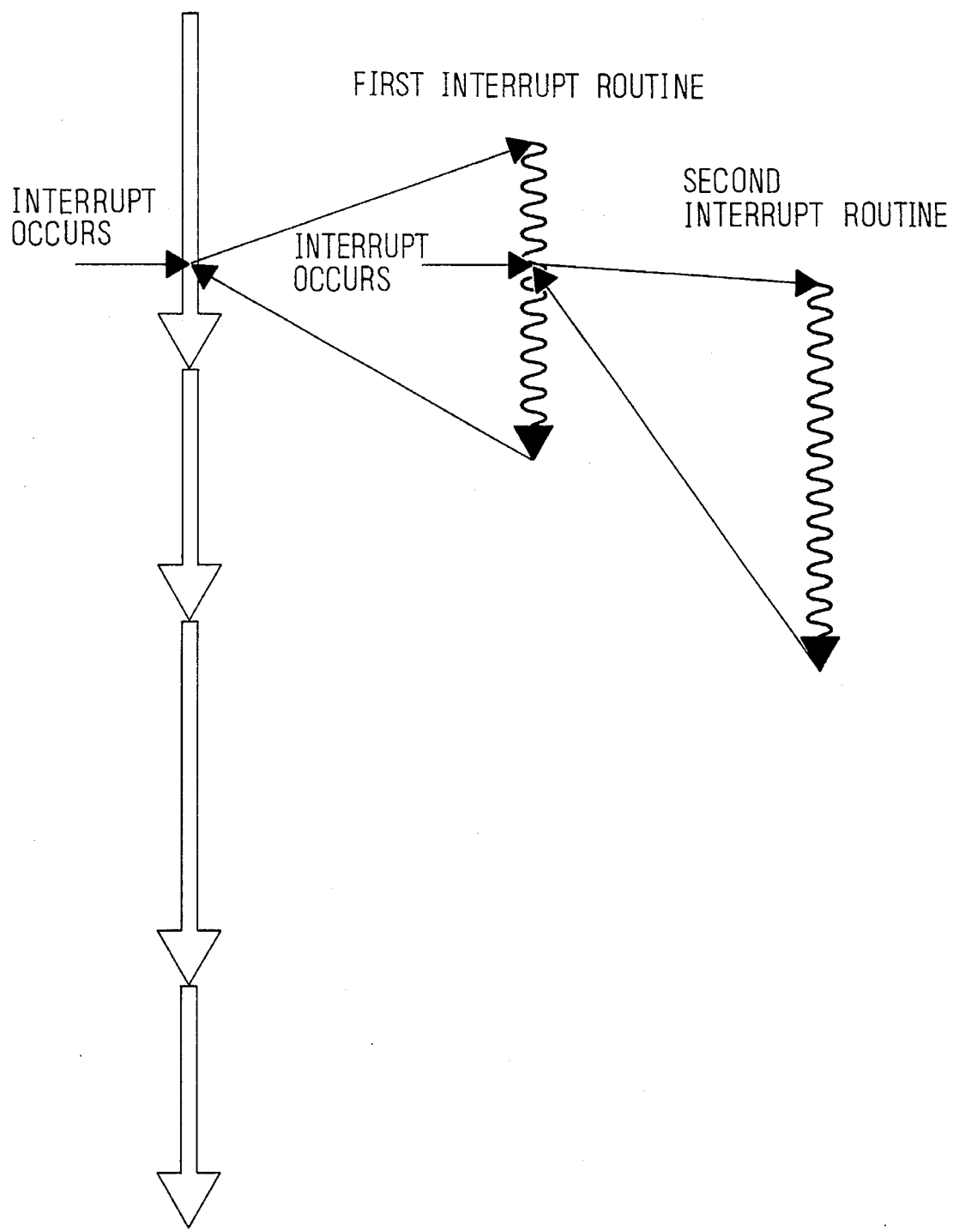
FIG. 18 is a view illustrating the case where a double interrupt is enabled in the conventional embodiment.

FIG. 16 illustrates the case which enables a double interrupt in which another process interrupts the execution of the previous interrupt process. Since the number of the shift registers is three, a triple interrupt is enabled for the above stack circuit 202 in the present embodiment. If an N-fold interrupt (N is an integer equal to or more than 2) is to be enabled, it is sufficient to increase the number of the shift registers provided in the above stack circuit 202 to N.

We claim:

1. A method of controlling the execution of a sequence of processes of a routine subjected to an interrupt in a processor, comprising the steps of:

suspending, on receiving an interrupt instruction, a process being executed and storing an address of the suspended process;

then forcibly executing an interrupt process in response to said interrupt instruction;

determining, upon completion of the execution of said interrupt process, whether to resume the execution of the suspended process or to execute a different process other than said suspended process;

then selecting said stored address or an address of said different process depending on the result of the determining step; and shifting to a process according to the selected address.

2. The method of controlling an interrupt in a processor according to claim 1, wherein said step of executing an interrupt process may be interrupted at least one time during the execution of said interrupt process.

3. The method of controlling an interrupt in a processor according to claim 2, wherein, if the address of a process other than the suspended process is selected upon completion of the interrupt process, the address of the process stored at the time of receiving the interrupt instruction is reset.

4. A method of controlling the execution of a sequence of processes of a routine subjected to an interrupt in a processor, comprising the steps of:

suspending, on receiving an interrupt instruction, a process being executed and storing an address of the suspended process in a stack;

then forcibly executing an interrupt process in response to said interrupt instruction;

determining, upon completion of the execution of said interrupt process, whether to resume the execution of the suspended process or to execute a different process other than said suspended process;

then fetching, said address stored in said stack and selecting said fetched address or an address of said different process depending on the result of determining step; and shifting to a process according to the selected address.

5. The method of controlling an interrupt in a processor according to claim 1, 4, 2, or 3, wherein the address of a process other than the suspended process is inputted from the outside of the processor.

6. The method of controlling an interrupt in a processor according to claim 1, 4, 2, or 3, wherein the address of a process other than the suspended process is preliminarily stored inside the processor.

7. The method of controlling an interrupt in a processor according to claim 6, wherein:

upon completion of the execution of the interrupt process, a return instruction for commanding the selection of the address stored at the time of interrupt or a branch return instruction for commanding the-selection of a process other than the process suspended at the time of interrupt is outputted depending on the result of the interrupt process; and said branch return instruction includes the address of a process other than said suspended process.

8. The method of controlling an interrupt in a processor according to claim 6, wherein a plurality of addresses of processes other than the suspended process are preliminarily stored inside the processor so that an address select signal inputted from the outside of the processor selects any one from said plurality of addresses.

9. A circuit for controlling the execution of a sequence of processes of a routine subjected to an interrupt in a processor, comprising:

a process storage means for storing a plurality of processes;

an interrupt processing means for receiving an interrupt instruction for suspending a process that is one of said plurality of processes stored in said process storage means being executed, and forcibly executing an interrupt process that is a different one of the plurality of said processes stored in said process storage means in response to said interrupt instruction;

an interrupt address storing means for storing an address of the process suspended by said interrupt processing means;

determining means for determining, upon completion of the execution of said interrupt process, whether to resume the execution of the suspended process or to execute another different process stored in said process storage means other than said suspended process;

an address selecting means responsive to said determining means for selecting the address stored in said interrupt address storing means or an address of said different process; and a process shifting means for shifting to a process according to the address selected by said address selecting means.

10. The circuit for controlling an interrupt in a processor according to claim 9, wherein the address storing means also serves as an address storing means to be used at the output of a subroutine call instruction.

11. The circuit for controlling an interrupt in a processor according to claim 9, wherein the address storing means is a dedicated address storing means which is seperately provided from an address storing means to be used at the output of a subroutine call instruction.

12. The circuit for controlling an interrupt in a processor according to claim 9, wherein the address storing means is composed of a stack register having a capacity sufficient to store only one address.

13. The circuit for controlling an interrupt in a processor according to claim 9, wherein:

the address storing means is composed of a stack circuit in which input data is saved and from which said saved data is fetched; and said stack circuit comprises N-stage (N is an integer equal to or more than 2) shift registers connected in series and (N−25 1)-stage selectors for selecting inputs of said shift registers in the first to (N−1)th stages, said selector in the first stage selecting said input data in the case of saving data is said stack circuit, while selecting an output of the lower-stage shift register in the case of fetching data from said stack circuit, said selector in the second to (N−1) stages accepting an output of the upperstage shift register in the case of saving data in said stack circuit, while accepting an output of the lower-stage shift register in the case of fetching data from said stack circuit.

14. A circuit for controlling the execution of a sequence of processes of a routine subjected to an interrupt in a processor, comprising:

a program memory for determining whether to resume the execution of a suspended process or to execute a different process other than said suspended process and for outputting an instruction in accordance with the determination;

a program counter for outputting an address to said program memory;

a calculator for calculating an address of a process being executed in response to said address outputted from said program counter;

a further memory for saving, in response to an interrupt instruction, the address of said process being executed;

an address selector for accepting an address outputted from said calculator, the address saved in said further memory, an address of an interrupt process at the time of interrupt, and an address of a process to which a branch return is to be made at the time of return from the interrupt, for selecting any one from said accepted addresses, and for outputting the selected address to said program counter;

a selection commanding means for inputting said instruction from said program memory and commanding, depending on the instruction, the selection of either the address saved in said further memory or said address to which a branch return is to be made; and an address controller responsive to said selection commanding means for controlling said address selector to select: the address ordinarily calculated by said calculator, said address of an interrupt process at the time of interrupt, and either said address saved in said further memory or said address to which a branch return is to be made upon completion of the execution of an interrupt process in accordance with a command by said selection commanding means.

* * * * *

UNITED STATES PATENT AND TRADEMARK OFFICE
CERTIFICATE OF CORRECTION

PATENT NO. : 5,566,338
DATED : October 15, 1996
INVENTOR(S) : Hisashi KODAMA et al.

It is certified that error appears in the above-indentified patent and that said Letters Patent is hereby corrected as shown below:

<u>Col. 12</u>, line 24, delete "seperately" and insert --separately--;

line 42, delete "is" and insert --in--; and line 44, delete "selector" and insert --selectors--.

Signed and Sealed this

Seventeenth Day of March, 1998

Attest:

BRUCE LEHMAN

*Attesting Officer*     *Commissioner of Patents and Trademarks*